US009282532B2

(12) United States Patent
Sen et al.

(10) Patent No.: US 9,282,532 B2
(45) Date of Patent: *Mar. 8, 2016

(54) INITIATING BEARER INDEPENDENT PROTOCOL SESSIONS USING ACCESS TECHNOLOGY AND LOCATION INFORMATION (71) Applicant: Apple Inc., Cupertino, CA (US)

(72) Inventors: Abhishek Sen, San Jose, CA (US); Madhusudan Chaudhary, Campbell, CA (US); Vikram B. Yerrabommanahalli, Sunnyvale, CA (US); Cesar Perez, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,572

(22) Filed: Apr. 6, 2015

(65) Prior Publication Data

US 2015/0257122 A1 Sep. 10, 2015

Related U.S. Application Data (63) Continuation of application No. 13/861,028, filed on Apr. 11, 2013, now Pat. No. 9,031,547.

(60) Provisional application No. 61/676,716, filed on Jul. 27, 2012.

(51) Int. Cl.
*H04W 64/00* (2009.01)
*H04W 48/08* (2009.01)
(Continued)

(52) U.S. Cl.
CPC ............ *H04W 64/003* (2013.01); *H04W 8/205* (2013.01); *H04W 8/22* (2013.01); *H04W 48/08* (2013.01)

(58) Field of Classification Search
CPC ...... H04W 8/22; H04W 64/003; H04W 48/16
USPC .......................... 455/418, 432.1, 435.1, 456.1
See application file for complete search history.

(56) References Cited

U.S. PATENT DOCUMENTS 7,266,371 B1 9/2007 Amin et al.
7,539,514 B2 5/2009 Shieh et al.
(Continued)

FOREIGN PATENT DOCUMENTS

EP 2028910 2/2009
EP 2276294 1/2011
EP 2293525 3/2011

OTHER PUBLICATIONS

Office Action from Taiwanese Application No. 102124601, issued Feb. 12, 2015, English and Chinese versions, pp. 1-6.
(Continued)

*Primary Examiner* — Sam Bhattacharya
(74) *Attorney, Agent, or Firm* — Meyertons Hood Kivlin Kowert & Goetzel, P.C.; Jeffrey C. Hood; Mark K. Brightwell (57) ABSTRACT

A user identity module (UIM) is incorporated in user equipment such as a mobile phone or mobile device. The UIM is configured to provision itself while roaming away from a home network as follows. The UIM may: send to the UE a request for information identifying a current radio access technology (RAT) that the UE is camped on; receive the current RAT information from the UE; send to the UE a request for network location information, where the network location information identifies a network in which the UE is currently camped; receive the network location information from the UE; generate an access point name (APN) using the current RAT information and the network location information; and open a channel through the network to a remote agent (e.g., a provisioning server) using the access point name.

20 Claims, 5 Drawing Sheets (51) Int. Cl.
*H04W 8/22* (2009.01)
*H04W 8/20* (2009.01)

(56) References Cited

U.S. PATENT DOCUMENTS

| | | | |
|---|---|---|---|
| 9,031,547 B2 * | 5/2015 | Sen et al. | ........................ 455/418 |
| 2012/0106443 A1 | 5/2012 | Chen et al. | |
| 2012/0282915 A1 | 11/2012 | Haynes et al. | |

2013/0029726 A1     1/2013   Berionne et al.

OTHER PUBLICATIONS

"Smart Cards; Card Application Toolkit (CAT) (Release 9)", ETSI TS 102 223 V9.0.0, Oct. 2009, pp. 1-208.
ETSI TS 102 223 v9.0.0, Smart Cards; Card Application Toolkit (CAT) (Release 9), Oct. 1, 2009, pp. 1-208.
U.S. Appl. No. 13/861,028, filed Apr. 11, 2013, Abhishek Sen.

* cited by examiner

INITIATING BEARER INDEPENDENT PROTOCOL SESSIONS USING ACCESS TECHNOLOGY AND LOCATION INFORMATION

RELATED APPLICATION DATA

This application is a continuation of U.S. patent application Ser. No. 13/861,028, entitled "Using Access Technology and Location Information to Smartly Initiate Bearer Independent Protocol Sessions", filed Apr. 11, 2013, which claims the benefit of priority to U.S. Provisional Application No. 61/676,716, filed on Jul. 27, 2012, entitled "Using Access Technology and Location Information to Smartly Initiate BIP Sessions", invented by Abhishek Sen, Madhusudan Chaudhary, Vikram B. Yerrabommanahalli, and Cesar Perez. All of the above identified Applications are hereby incorporated by reference in their entireties as though fully and completely set forth herein.

FIELD

The present embodiments relate to the field of wireless telecommunication, and more particularly to a mechanism allowing a user identity module (UIM) that is incorporated/inserted/included in user equipment (UE) to provision itself in a roaming scenario and/or to provision itself according to the radio access technology the user equipment is currently camped on.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

Subscribers in a wireless telecommunication network (e.g., a cellular telecommunication network) are typically assigned subscriber identity information, which may be stored, e.g., in a subscriber identity module (SIM) of the subscriber's user equipment (UE) device. The SIM may also be referred to as a User Identity Module (UIM). As an example of subscriber identity information, subscribers in 3GPP (LTE/GSM/UMTS) networks have an International Mobile Subscriber Identity (IMSI) that identifies them in their carrier's network. The IMSI includes a 3-digit Mobile Country Code (MCC), a 3-digit Mobile Network Code (MNC), and a 9-digit Mobile Station Identification Number (MSIN).

According to the ETSI standard TS 102 223 V9.0.0, the UIM sends the UE proactive commands which can trigger an alteration of the behavior of the UE. Furthermore, the UE can send envelope commands to the UIM, e.g., to inform the UIM of changes in location information (PLMN), changes in access technology, changes in time zone, call control events, menu selection events, etc. (A menu selection event is said to occur when the user makes a selection from a menu, e.g., a menu displayed on a graphical user interface.)

Before a user can employ the UE to access subscribed services from the network, the UIM must be provisioned. There exist methods for provisioning the UIM when the UE is camped in a home scenario. However, it may be more difficult to provision the UIM in a roaming scenario, i.e., when the UE is roaming away from the user's home network. Thus, there exists a need for methods enabling the UIM to provision itself in a roaming scenario.

SUMMARY

In some embodiments, the user identity module (UIM) in the user equipment (UE) may use the UE's currently-camped access technology information and the UE's currently-camped location information (e.g., MCC and/or MNC) to determine the correct access point name (APN) information when initiating a data call via an open channel command. The UIM may query for the UE's currently-camped access technology and query for the device's currently-camped location information (MCC/MNC), e.g., by executing proactive commands as described in:

ETSI TS 102 223 V9.0.0 (2009-10), entitled "Smart Cards; Card Application Toolkit (CAT) (Release 9)".

(ETSI is an acronym for "European Telecommunications Standards Institute".) This process of determining the correct APN information and initiating a data call may be used to provision the UIM, especially in roaming scenarios where roaming APNs might need to be used. (For example, the data call may be to a provisioning server.) As used herein, the phrase "provisioning the UIM" means performing any operation or operations necessary to enable the UE and/or the UIM (via the UE as a data bearer) to start exchanging user data and/or user voice traffic. The UE is said to be "camping on a radio access technology" whenever the UE is in a state of listening to the system information provided by a base station operating according to the radio access technology, and thus, the UE is able to quickly initiate a connection with that base station. The UE device is said to be "camping on a network" whenever the UE is in a state of listening to the system information provided by a base station belonging to the network, and thus, the UE is able to quickly initiate a connection with that network via the base station. As used herein, the term "roaming" is used to describe the situation where the UE is camped on a network different from the home network, or, camped on a network in a different country away from the home network.

In some embodiments, a method for operating a UIM may involve: (a) sending to the UE a request for current radio access technology (RAT) information, where the current RAT information identifies a current RAT that the UE is camped on; (b) receiving the current RAT information from the UE; (c) sending to the UE a request for network location information, where the network location information identifies the network on which the UE is currently camped; (d) receiving the network location information from the UE; (e) generating or determining an access point name (APN) using the current RAT information and the network location information; and (f) opening a data channel through the network to a remote agent using the access point name. The UIM may use a bearer independent protocol (BIP) to open the data channel.

BRIEF DESCRIPTION OF THE DRAWINGS

A better understanding of the present embodiments can be obtained when the following detailed description is considered in conjunction with the following drawings.

While embodiments described herein susceptible to various modifications and alternative forms, specific embodiments thereof are shown by way of example in the drawings and are herein described in detail. It should be understood, however, that the drawings and detailed description thereto are not intended to limit the embodiments to the particular form disclosed, but on the contrary, the intention is to cover all modifications, equivalents and alternatives falling within the spirit and scope of the present embodiments as defined by the appended claims.

DETAILED DESCRIPTION OF THE EMBODIMENTS

Acronyms

The following acronyms are used herein.
3GPP: Third Generation Partnership Project
3GPP2: Third Generation Partnership Project 2
APN: Access Point Name
BIP: Bearer Independent Protocol
CAT: Card Application Toolkit
CDMA: Code Division Multiple Access
eSIM: Embedded SIM
ETSI: European Telecommunications Standards Institute
GSM: Global System for Mobile Communications
HLR: Home Location Register
IMSI: International Mobile Subscriber Identity
LTE: Long Term Evolution
MCC: Mobile Country Code
MNC: Mobile Network Code
OTA: Over-The-Air
PIN: Personal Identification Number
PLMN: Public Land Mobile Network
PRL: Preferred Roaming List
PUK: Personal Unblocking Code
RAT: Radio Access Technology
SIM: Subscriber Identity Module
UE: User Equipment
UICC: Universal Integrated Circuit Card
UIM: User Identity Module
UMTS: Universal Mobile Telecommunications System

Terminology

The following is a glossary of terms used herein.

Memory Medium—A memory medium is a non-transitory medium configured for the storage and retrieval of information. Examples of memory media include: various kinds of semiconductor-based memory such as RAM and ROM (including static RAM and dynamic RAM of various kinds, and PROM, EPROM, EEPROM and flash memory of various kinds); various kinds of magnetic media such as magnetic disk, tape, strip and film; various kinds of optical media such as CD-ROM, DVD-ROM and holographic media; various media based on the storage of electrical charge and/or any of a wide variety of other physical quantities; media fabricated using various lithographic techniques; etc. The term "memory medium" includes within its scope of meaning the possibility that a given memory medium might be a union of two or more memory media that reside at different locations, e.g., on different chips in a system or on different computers in a network. A memory medium is typically computer-readable, e.g., is capable of being read by a computer.

A computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising a plurality (e.g., an array) of programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, mobile phone, tablet computer, television system, grid computing system, a user equipment device, a user identity module, or other device or combinations of devices. In general, the term "computer system" can be broadly defined to encompass any device (or combination of devices) having at least one processor that executes instructions stored in a memory medium.

User Equipment (UE)—any of various types of computer system devices which are mobile or portable and which perform wireless communications. Examples of UEs include mobile phones or smart phones (e.g., iPhone™, Android™-based phones), portable gaming devices (e.g., Nintendo DS™, PlayStation Portable™, Gameboy Advance™, iPhone™), laptops, tablet computers, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform.

For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present patent provides various examples of operations being automatically performed in response to actions the user has taken.

Figure 1:
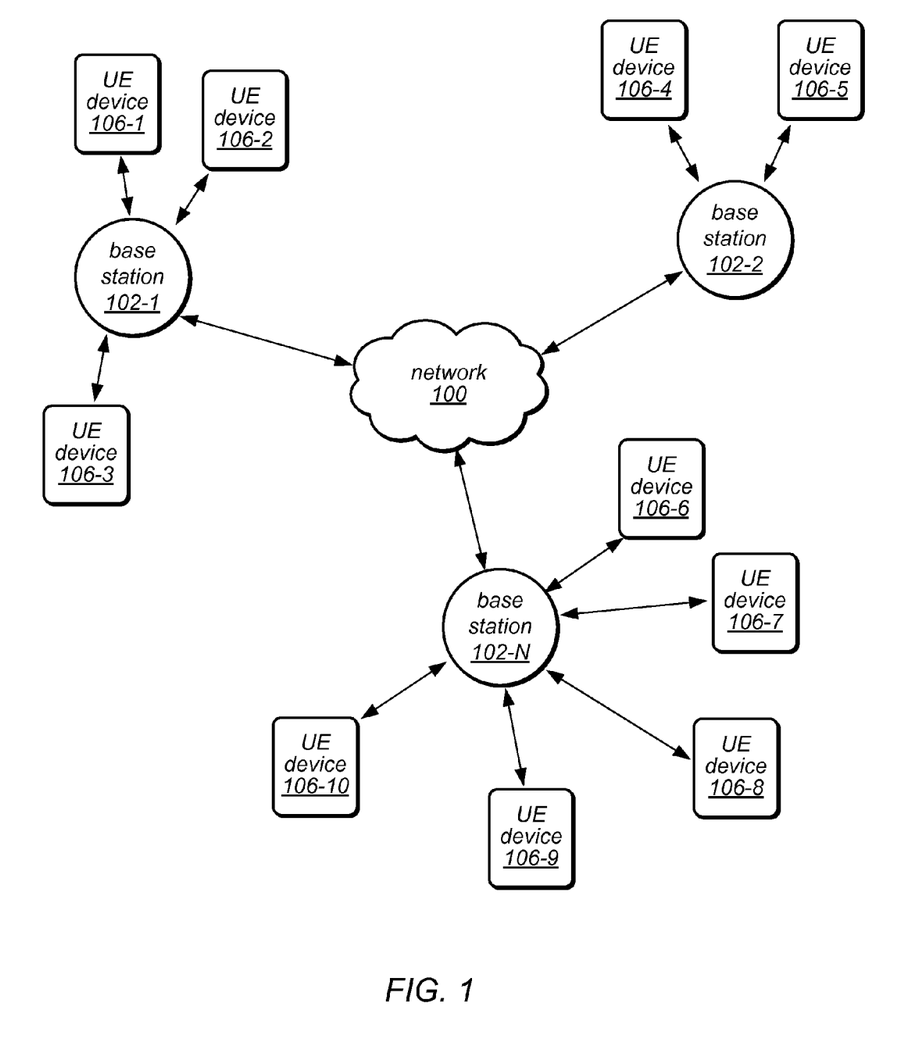
FIG. 1 illustrates one embodiment of a wireless communication system.
Figure 2:
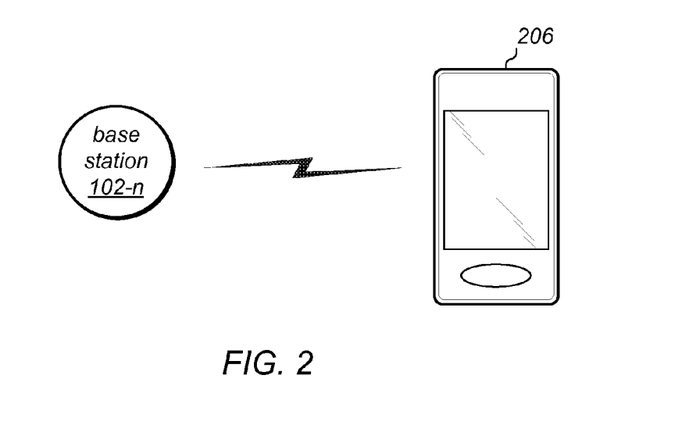
FIG. 2 illustrates a base station 102-*n* in communication with user equipment (UE) device 206, according to one embodiment.

FIGS. 1-2: Communication System

FIG. 1 illustrates a wireless communication system according to one possible embodiment.

A plurality of UEs 106 wirelessly communicate with a plurality of base stations 102-1 through 102-N. The base stations 102-1 through 102-N may couple to a network 100. The base stations may be partitioned into subsets based on the type of radio access technology (RAT) or wireless communication standard they are configured to use for communicating with UEs. For example, a first subset of the base stations may use a first RAT for communicating with UEs. A second subset of the base stations may use a second RAT to communicate with UEs, and so on. (The total number of UEs and the number of UEs per base station shown in FIG. 1 are not meant to be limiting. Arbitrary numbers are contemplated.) The RATs used by the subsets of base stations may include RATs conforming to GSM, CDMA, GPRS, W-CDMA, EDGE, CDMA2000, LTE, WiMAX, WiFi, Bluetooth, etc.

Each UE 106-k may be configured to communicate using any of a plurality of radio access technologies. (The UE may also be referred to simply as "a user device" or "mobile device" or "UE device".) As the UE 106-k moves geographically from one region to another, it may need to use different RATs. Thus, the current RAT being used by the UE 106 may change from time to time. FIG. 1 shows UE 106-1 in the vicinity of a base station 102-1 which uses a first RAT. However, if the UE 106-1 moves into the neighborhood of base station 102-2, it may need to use a different RAT, and so on.

Each base station 102-n, n=1, 2, . . . , N, may be configured to receive wireless signal transmissions from UEs, recover respective streams of network-directed data from the signal transmissions, and to transmit the streams of network-directed data to the network 100. Moreover, each base station 102-n may be configured to receive streams of device-directed data from the network 100, modulate the streams of device-directed data onto respective signals, and wirelessly transmit the modulated signals to the respective UEs. Thus, the base stations may facilitate communication between the UEs and the network 100. The base stations may also facilitate communication between the UEs.

The network 100 may be operated by a wireless network operator or service provider. The network 100 may couple to one or more other networks, e.g., the Internet and/or the public switched telephone network (PSTN).

Different network operators (or service providers or wireless carriers) may operate different networks. The networks may be interconnected via the Internet and/or by other means. The user of a given UE device may be subscribed with a particular network operator, and thus, be permitted to use his/her UE device within the operator's network. That network is referred to as being the "home network" of the UE device. However, before the UE device can operate to exchange user data and/or user voice conversations as intended, the UIM of the UE device must be provisioned. There exist mechanisms for performing this provisioning when the UE device is located within the geographical region covered by the home network. In contrast, when the UE device is located outside the home network geographical region, it may be more difficult for the UIM to provision itself via roaming networks, i.e., networks other than the home network.

Figure 1B:
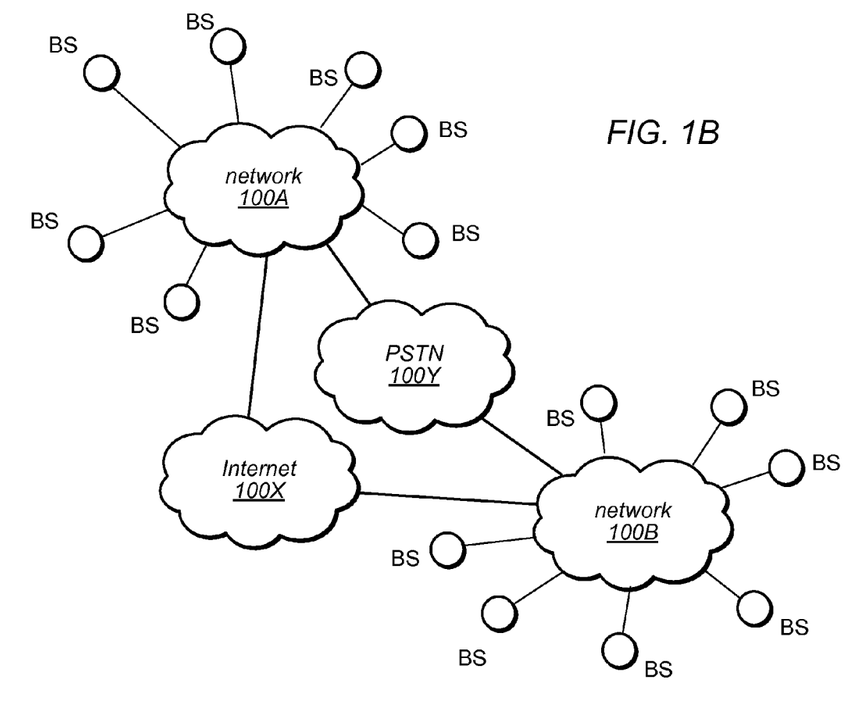
FIG. 1B illustrates shows a network 100A which is coupled to a network 100B, e.g., via the Internet 100X and/or the PSTN 100Y.

FIG. 1B shows a network 100A which is coupled to a network 100B, e.g., via the Internet 100X and/or the PSTN 100Y. Each network provides a corresponding set of base stations (each of which is denoted "BS") and other infrastructure (not shown) through which subscribed UE devices may access the network, the Internet 100X and/or the PSTN 100Y. A given UE device may have network 100A as its home network. The present disclosure describes mechanisms allowing the UIM of the UE device to provision itself even when roaming away from the home network 100A, e.g., when roaming within the geographical region of network 100B. While FIG. 1B shows each set of base stations as surrounding the corresponding network, that visual feature is used only to avoid complication in the diagram and is not meant to be limiting. More typically, each set of base stations may be distributed in a two-dimensional fashion so as to cover a geographical region or a collection of geographical regions. Each base station may define a corresponding cell within a given region, as is known in the art of cellular networks.

The UE 106-k may include hardware and/or software for wirelessly communicating using a plurality of RATs. For example, the UE may be configured to communicate using a 3GPP RAT (such as LTE) and a 3GPP2 RAT (such as CDMA2000). Other combinations of RATs (e.g., including more than two RATs) are also possible. In some embodiments, the UE might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc.

FIG. 2 illustrates user equipment (UE) 206 (e.g., one of the devices 106-1 through 106-N as variously described above) in communication with a base station 102-n. The UE 206 may be a device with wireless network connectivity such as a smart phone, a mobile phone, a hand-held device, a personal digital assistant, an mobile Internet appliance, a portable computer, a tablet computer, a portable media player, or virtually any type of wireless device.

The UE 206 may include a processor and memory, where the processor is configured to execute program instructions stored in the memory. Thus, the UE 206 may perform any desired method by executing such stored program instructions. In some embodiments, the UE 206 may alternatively or additionally include an application specific integrated circuit (ASIC) and/or a field programmable gate array (FPGA). The UE 206 may include an ASIC or an FPGA that is configured to perform any desired method.

In some embodiments, the UE 206 may be configured to communicate using any of a plurality of radio access technologies (RATs), e.g., based on the RAT supported by the nearest (or strongest) base station to the UE 206. For example, the UE 206 may be configured to communicate using two or more of CDMA 2000, LTE, UMTS, WLAN, GSM, GPRS, WiMax or GNSS. Other combinations of RATs are also possible.

In some embodiments, the UE 206 may include one or more antennas and one or more transceivers. The one or more transceivers are configured to transmit and receive wireless signals through the one or more antennas. Each transceiver may be configured to transmit and receive signals according a corresponding radio access technology. In some embodiments, a transceiver may be programmable so that it can transmit and receive according to different radio access technologies at different times. The UE 206 may include one or more programmable transceivers.

Figure 3:
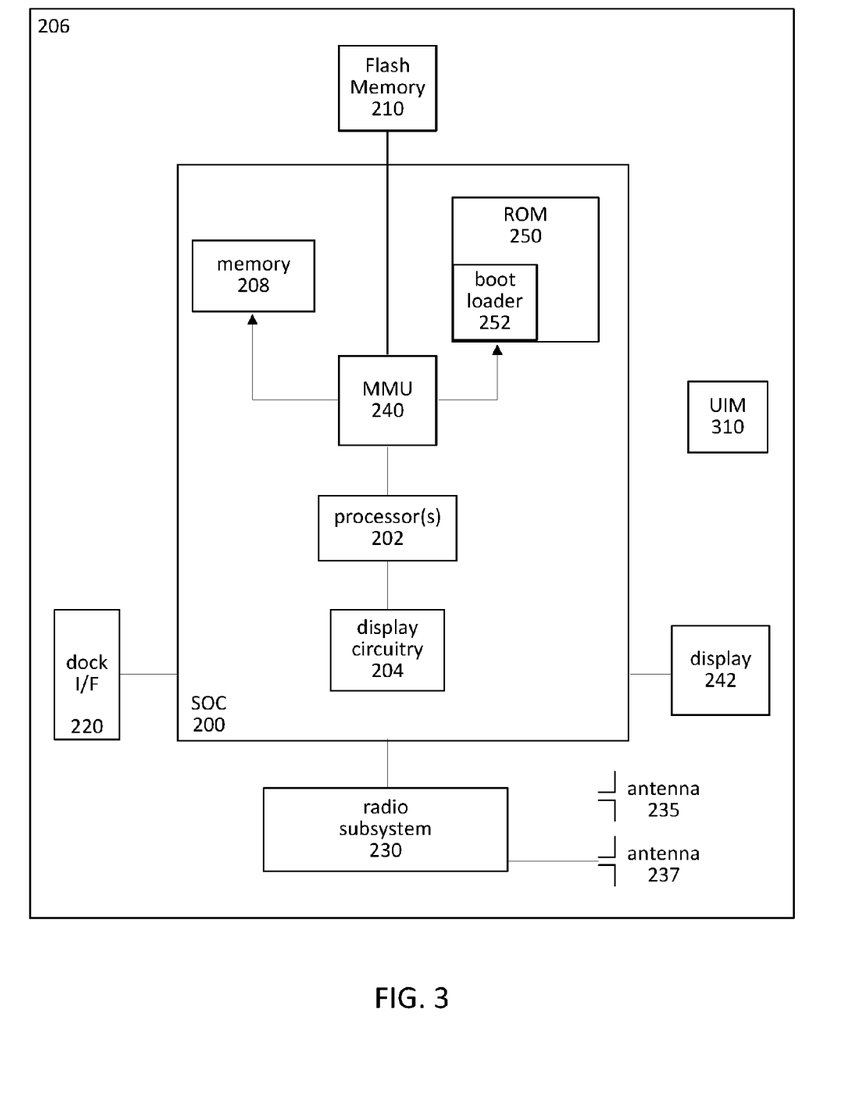
FIG. 3 illustrates a block diagram of a user equipment device 206, according to one embodiment.

FIG. 3—Example Block Diagram of a UE

FIG. 3 illustrates a block diagram of the UE 206 according to one embodiment. The UE 206 may include hardware and software components for performing data and/or voice communication with network 100 via one or more of the base stations. As shown in FIG. 3, the UE 206 may include a system on chip (SOC) 200, which may include portions for various purposes. For example, as shown, the SOC 200 may include processor(s) 202 which may execute program instructions for the UE 206. The processor(s) 202 may couple to display circuitry 204 and memory management unit 240. Display circuitry 204 may perform graphics processing and provide display signals to the display 242. Memory management unit (MMU) 240 may be configured to receive addresses from the processor(s) 202 and translate those addresses to locations in memory, e.g., memory 208, read only memory (ROM) 250 and flash memory 210. ROM 250 may include a bootloader 252, which may be executed by the processor(s) 202 during boot up or initialization. The MMU 240 may be configured to perform memory protection and page table translation and/or set up. In some embodiments, the MMU 240 may be included as a portion of the processor(s) 202.

The SOC 200 may couple to other circuits or devices, such as user identity module 310, memory (e.g., flash memory 210), connector interface 220, radio subsystem 230 and display 242.

The connector interface 220 may be configured for coupling to an external computer system.

The radio subsystem 230 may be configured for wireless communication with base stations and/or other devices according to a plurality of radio access technologies, e.g., as described above. In some embodiments, the radio subsystem 230 may communicate according to a selected one of the radio access technologies at any given time, e.g., based on a selection specified by processor(s) 202. In other embodiments, the radio subsystem 230 may allow simultaneous communication using two or more selected ones of the radio access technologies. The radio subsystem 230 may include one or more transceivers, e.g., as described above.

The UE 206 may include one or more antennas. The radio subsystem 230 receives and transmits signals into space through the one or more antennas. For example, the UE 206 may use antennas 235 and 237 to perform the wireless communication. In some embodiments, the radio system 230 is configured for MIMO communication with base stations using two or more antennas.

The User Identity Module (UIM) 310, also referred to as a SIM (Subscriber Identity Module), may include its own processor and memory. The memory may store program instructions (e.g., organized in terms of one or more programs or modules or software applications). The processor is configured to read and execute the program instructions. By executing the program instructions, the processor may initiate a BIP session as described variously herein, e.g., in order to provision itself (or re-provision itself) through an open channel to a provisioning server. BIP is an acronym for "Bearer-Independent Protocol".

The UIM 310 may be removable. In some embodiments, the UIM may be implemented on a card, e.g., a removable smart card or removable SIM card. In one embodiment, the UIM may be installed on a removable UICC.

Alternatively, the UIM may be embedded in the UE 206 and not conveniently removable. In some embodiments, the UE 206 may include an embedded UICC (eUICC), e.g., a device that is built into the UE 206 and is not removable. The eUICC may be programmable, such that an embededed SIM (eSIM) may be implemented on the eUICC. In other embodiments, the eSIM may be installed in UE 206 software, e.g., as a set of program instructions stored on a memory medium (such as memory 208) executing on a processor (such as processor 202) in the UE 206.

The UIM 310 may store a number of types of information, including an International Mobile Subscriber Identity (IMSI) number which identifies the subscriber to his/her carrier's network. The IMSI may, for example, be a number including the subscriber's "home" mobile country code (MCC) and "home" mobile network code (MNC), as well as a Mobile Subscription Identification Number (MSIN) which is unique to the subscriber. The information stored in the UIM may also or alternatively include a personal identification number (PIN) (e.g., a code which the user may use to access the UIM), a personal unblocking code and/or personal unblocking key (PUC/PUK), and one or more authentication keys (K/Ki). Any of a variety of other information may be implemented on the UIM, depending on the embodiment.

The processor 202 of the UE 206 may be configured to implement any of the methods described herein or parts thereof, e.g., by executing program instructions stored on a memory medium (e.g., a non-transitory computer-readable memory medium). In some embodiments, processor 202 may be configured as a programmable hardware element such as an FPGA (Field Programmable Gate Array) and/or as an ASIC (Application Specific Integrated Circuit).

Figure 4:
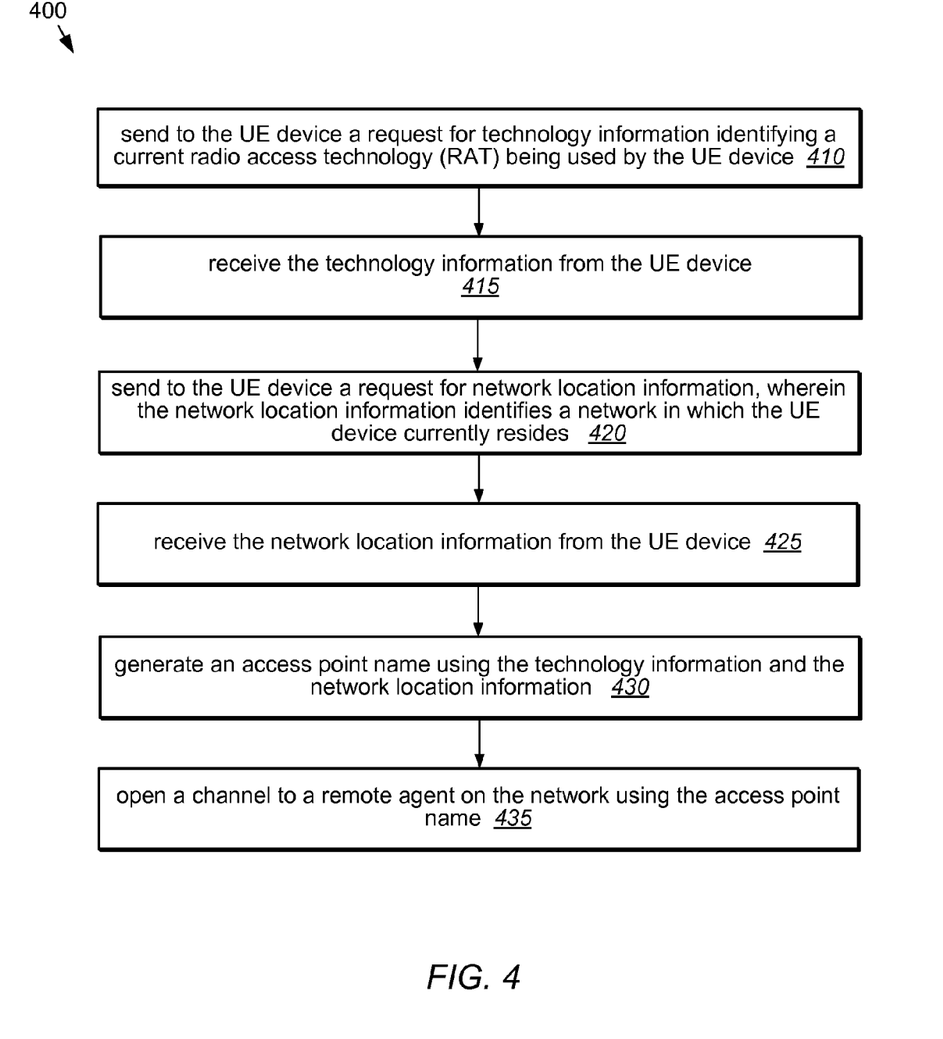
FIG. 4 is a flowchart diagram illustrating a method for operating a user identity module (UIM), according to one embodiment.

FIG. 4—Flowchart

In one set of embodiments, a method 400 for operating a user identity module (UIM) may involve the operations shown in FIG. 4. (The method 400 may also include any subset of the features, elements and embodiments described above.) The UIM is incorporated in a user equipment (UE) device. (By saying that the UIM is "incorporated" in the UE device, we do not mean to suggest that the UIM is permanently coupled to the UIM. Indeed, in many implementations, the UIM may be configured as a removable module.) The method 400 may be performed by a processor that is included as part of the UIM. The processor may perform the method 400 by executing program instructions stored in a memory, e.g., a memory in the UIM. The method 400 may be performed while the UE device is roaming away from a home network. The method 400 may include the following operations.

At 410, the UIM may send to the UE device a request for technology information identifying a current radio access technology (RAT) being used by the UE device, i.e., the radio access technology that the UE device is currently camped on. In some embodiments, the UIM may execute or assert the PROVIDE LOCATION INFORMATION command as defined in a communication standard such as ETSI Standard TS 102 223 v9.0 to obtain the current RAT. In other embodiments, e.g., in the case of an implementation that is specific to a particular network operator (i.e., not conforming to any standardized specification), the UIM may request the technology information by executing a custom-designed command. The UIM and UE device may include software infrastructure for communicating with each other through the hardware interface connecting the UIM and UE, e.g., a software infrastructure conforming to one or more standards such as the ISO standards for SIM cards.

The current RAT is a member of the set $S_{RAT}$ of radio access technologies supported by the UE device. The technology information may be stored in a memory of the UE device. Thus, the UE device may access its memory upon receiving the request from the UIM, and respond by transmitting the technology information to the UIM. Radio access technologies that might populate the supported set $S_{RAT}$ might include, for example, GSM, GPRS, UMTS, LTE, CDMA2000, WiMAX. The supported set $S_{RAT}$ may be different for different types or models of UE device and/or for different network providers. For example, UE devices configured for use with one network provider may support the combination of CDMA2000 and LTE, while UE devices configured for use with another network provider may support the combination of GSM/GPRS, UMTS and LTE, while UE devices configured for use with yet another network provider may support the combination of GSM and LTE.

At 415, the UIM may receive the technology information from the UE device.

At 420, the UIM may send to the UE device a request for network location information, e.g., by asserting another proactive command or a custom-designed command. The network location information identifies a network in which the UE device currently resides (i.e., in which the UE device is currently camped). Networks in which the UE device may be camped include, for example, the networks provided by carriers such as Verizon, Sprint, ATT, T-Mobile, China Unicom, Orange, Vodafone, etc. (The network may be identified by the MCC-MNC pair reported to the UIM by the UE.)

The network location information may include a mobile country code (MCC) and a mobile network code (MNC). The network location information may be stored in the memory of the UE device. (The UE device is assumed to be successfully camped on some radio access technology. Thus, the UE device will be in possession of the network location information.) The UE device may access the network location information from the memory in response to the location request, and respond by transmitting the network location information to the UIM.

At 425, the UIM may receive the network location information from the UE device.

At 430, the UIM may generate (or determine) an access point name of the network (i.e., the currently-camped network) using the technology information and the network location information. The access point name may include the mobile country code and the mobile network code of the network. The access point name may also include a special name used by the network. The process or algorithm by which the technology information and network location information are used to generate an access point name for the currently-camped network is dependent on the network operator of the home network associated with the UIM. In other words, the home network operator is free to specify how the UIM determines the access point name based on the technology information and the network location information. For example, the home network operator may require that the UIM use the technology information and the roaming operator's special provisioning-name to select an APN that has been previously stored in the UIM. The home network operator (or an agent of the home network operator) may previously store a list of APNs in the UIM, e.g., APNs used by various networks that might be visited by the UE device. Likewise, the home network operator (or an agent of the home network operator) may previously store a list of special names, including provisioning names, used by the various networks. In one embodiment, the UIM determines the access point name by performing a table lookup in the APN list using the technology information and the network location information.

At 435, the UIM may open a channel to a remote agent (e.g., a remote server) through the network using the access point name. The network responds with an indication that the channel has been established. For example, the UIM may connect to the remote server via an OPEN CHANNEL proactive command that contains the APN information, type of internet socket being opened (TCP/UDP), etc. The confirmation for OPEN CHANNEL command indicates to the UIM that the data call has been successfully established. The UIM can then start transferring data back and forth between itself and the remote server via the channel.

The channel may be opened using a bearer independent protocol (BIP), e.g., the bearer independent protocol as standardized in TS 102 223 v9.0. Thus, the channel may be a BIP channel. The bearer independent protocol is a mechanism that enables the UIM to communicate with the network in a manner that is independent of the particular data bearer(s) used by the UE device. The term "data bearer" refers to a communication protocol used by the UE device to communicate data via the network. Examples of data bearers that might be supported by the UE device include: data over cellular technologies (such as LTE, eHRPD, CDMA, etc.), WiFi, etc. BIP ensures that the communication is not dependent on the RAT or access technology.

The method 400 may also include: requesting UIM provisioning information (e.g., program code and/or subscriber identity information) from the remote agent via the channel that has been opened; and receiving the provisioning information from the remote agent via the channel. (The provisioning information allows the UIM to be used with the UE device. The provisioning information may provide the UIM with correct subscription parameters such as phone number, voicemail number, PLMN camping information, PRL updates for correct device camping behavior, etc.

In some embodiments, the UE device may be programmed to send envelope commands and/or custom designed commands to the UIM, informing the UIM of changes in location information (e.g., PLMN changes), changes in radio access technology (RAT), time zone changes, call control events, user menu selection events, etc. The UIM may generate the access point name and open the channel to the remote agent in response to receiving one or more such commands from the UE device.

The embodiments described herein may be realized in any of various forms. For example, some embodiments may take the form of a computer-implemented method, a computer-readable memory medium, or a computer system. Some embodiments may be realized using one or more custom-designed hardware devices such as ASICs. Some embodiments may be realized using one or more programmable hardware elements such as FPGAs.

In some embodiments, a non-transitory computer-readable memory medium may be configured so that it stores program instructions and/or data, where the program instructions, if executed by a processor, cause the processor to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions, when executed by the processor, cause the processor to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a mobile device, a tablet computer, a wearable computer or a user identity module (UIM) as variously described herein.

Figure 5:
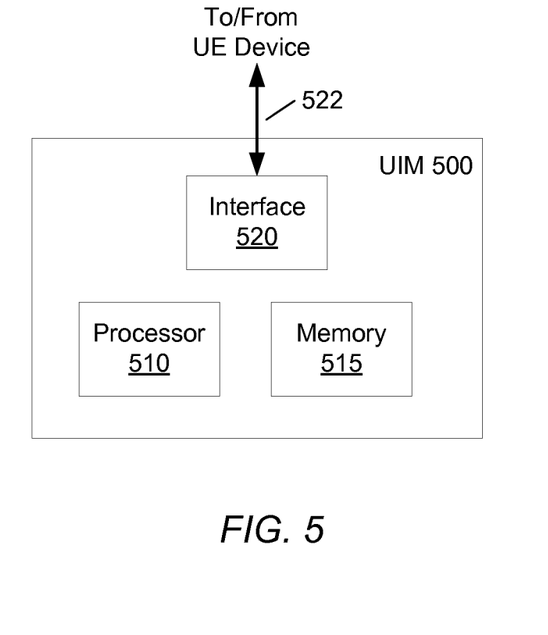
FIG. 5 illustrates one embodiment of a user identity module (UIM) 500 that includes a processor 510 and memory 515.

FIG. 5 shows a user identity module (UIM) 500 that includes a processor 510, memory 515 and an interface 520. (UIM 500 may also include any subset of the elements, features and embodiments described above.) The processor 510 is configured to execute program instructions and operate on data stored in the memory 515, and thus, to implement any of the various methods described herein or any combination of those methods. The interface 520 is configured to handle communication with the UE device (e.g., the UE device 206) over the interconnection bus 522, i.e., communication with the UE device in which the UIM is incorporated, e.g., inserted.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for operating a user identity module (UIM) that is incorporated in a user equipment (UE) device, the method comprising:
  receiving first information from the UE device, wherein the first information identifies a radio access technology that the UE device is currently camped on;
  receiving network location information from the UE device, wherein the network location information identifies a network on which the UE device is currently camped; and
  opening a channel through the network to a remote agent using an access point name, wherein the access point name is generated using the first information and the network location information.

2. The method of claim 1, wherein said opening the channel is performed using a bearer independent protocol (BIP).

3. The method of claim 1, further comprising:
  requesting provisioning information from the remote agent via the channel;
  receiving the provisioning information from the remote agent via the channel.

4. The method of claim 1, wherein the network location information includes a mobile country code (MCC) and a mobile network code (MNC).

5. The method of claim 1, wherein said generating the access point name includes accessing the access point name from a list of access point names using the first information and the network location information, wherein the list is stored in a memory of the UIM or a memory of the UE device.

6. The method of claim 1, wherein the UE device is configured to transmit the network location information to the UE device in response to an execution of a PROVIDE LOCATION INFORMATION command by the UIM.

7. The method of claim 1, wherein the method is performed while the UE device is roaming away from a home network associated with the UIM.

8. A non-transitory memory medium storing program instructions, wherein the memory medium is readable by a processor included in a user identity module (UIM), wherein the user identity module is configured for incorporation in a user equipment (UE) device, wherein the program instructions, when executed by the processor, cause the processor to implement:
  receiving first information from the UE device, wherein the first information identifies a radio access technology that the UE device is currently camped on;
  receiving network location information from the UE device, wherein the network location information identifies a network on which the UE device is currently camped; and
  opening a channel through the network to a remote agent using an access point name, wherein the access point name is generated using the first information and the network location information.

9. The memory medium of claim 8, wherein the program instructions, when executed by the processor, further cause the processor to implement:
  requesting provisioning information from the remote agent via the channel;
  receiving the provisioning information from the remote agent via the channel.

10. The memory medium of claim 8, wherein the network location information includes a mobile country code (MCC) and a mobile network code (MNC).

11. The memory medium of claim 8, wherein said generating the access point name includes accessing the access point name from a list of access point names using the first information and the network location information, wherein the list is stored in a memory of the UIM or a memory of the UE device.

12. The memory medium of claim 8, wherein said opening the channel is performed using a bearer independent protocol (BIP).

13. The memory medium of claim 8, wherein said network is different from a home network associated with the UIM.

14. The memory medium of claim 8, wherein the memory medium is incorporated in the UIM.

15. A user identity module (UIM) that is configured for incorporation in a user equipment (UE) device, the UIM comprising:
  a processor; and
  memory storing program instructions, wherein the program instructions, when executed by the processor, cause the processor to:
    (a) receive first information from the UE device, wherein the first information identifies a radio access technology that the UE device is currently camped on;
    (b) receive network location information from the UE device, wherein the network location information identifies a network on which the UE device is currently camped; and
    (c) open a channel through the network to a remote agent using an access point name, wherein the access point name is generated using the first information and the network location information.

16. The UIM of claim 15, wherein the program instructions, when executed by the processor, further cause the processor to:
   request provisioning information from the remote agent via the channel; and
   receive the provisioning information from the remote agent via the channel.

17. The UIM of claim 15, wherein the network location information includes a mobile country code (MCC) and a mobile network code (MNC).

18. The UIM of claim 15, wherein said generating the access point name includes accessing the access point name from a list of access point names using the first information and the network location information.

19. The UIM of claim 15, wherein said opening the channel is performed using a bearer independent protocol (BIP).

20. The UIM of claim 15, wherein the program instruction are configured so that (a) through (c) are performed while the UE device is roaming away from a home network.

* * * * *